United States Patent [19]

Shiobara et al.

[11] Patent Number: 5,643,975
[45] Date of Patent: Jul. 1, 1997

[54] EPOXY RESIN COMPOSITIONS AND CURED PRODUCTS

[75] Inventors: Toshio Shiobara; Hisashi Shimizu, both of Annaka, Japan

[73] Assignee: Shin-Etsu Chemical Company, Limited, Tokyo, Japan

[21] Appl. No.: 413,929

[22] Filed: Mar. 30, 1995

Related U.S. Application Data

[63] Continuation of Ser. No. 181,953, Jan. 18, 1994, abandoned, which is a continuation of Ser. No. 695,012, May 3, 1991, abandoned.

[30] Foreign Application Priority Data

May 11, 1990 [JP] Japan ..................... 2-122251
Nov. 20, 1990 [JP] Japan ..................... 2-315014

[51] Int. Cl.$^6$ ............... C08L 9/02; C08L 63/00; C08L 51/00
[52] U.S. Cl. ............... 523/400; 525/64; 525/65; 525/68; 525/69; 525/77; 525/79; 525/109; 525/112; 525/113; 525/481; 525/486; 525/524; 525/529; 525/942
[58] Field of Search ............... 523/400; 525/64, 525/65, 68, 69, 77, 79, 109, 112, 113, 481, 486, 524, 529, 942

[56] References Cited

U.S. PATENT DOCUMENTS

| | | | |
|---|---|---|---|
| 4,366,289 | 12/1982 | Keskkula et al. | 525/76 |
| 4,371,668 | 2/1983 | Ikeda et al. | 525/208 |
| 4,419,496 | 12/1983 | Henton et al. | 525/78 |
| 4,529,755 | 7/1985 | Nishikawa et al. | 523/436 |
| 4,565,853 | 1/1986 | Herscovici et al. | 525/530 |
| 4,761,463 | 8/1988 | Matsumoto et al. | 525/74 |
| 4,778,851 | 10/1988 | Henton et al. | 525/65 |
| 4,786,675 | 11/1988 | Iwata et al. | 523/456 |
| 4,885,336 | 12/1989 | Boutni et al. | 525/67 |
| 4,897,447 | 1/1990 | Williams | 525/74 |
| 4,916,174 | 4/1990 | Yoshizumi et al. | 525/65 |
| 4,999,135 | 3/1991 | Matsuda et al. | 523/457 |
| 5,019,608 | 5/1991 | Shah | 525/112 |
| 5,068,267 | 11/1991 | Uehida et al. | 525/65 |
| 5,237,003 | 8/1993 | Otawa et al. | 525/66 |

FOREIGN PATENT DOCUMENTS 01-163254  6/1989  Japan.

OTHER PUBLICATIONS

"The HandBook of Epoxy Resins" Lee & Neville 1982 Reissue pp. (14–1 to 14–5, 15–16 and 15–17, 5–16 to 5–18).

Primary Examiner—John C. Bleutge
Assistant Examiner—Randy Gulakowski
Attorney, Agent, or Firm—Birch, Stewart, Kolasch & Birch, LLP

[57] ABSTRACT

An epoxy resin composition for semiconductor encapsulation use comprising an epoxy resin, a phenol resin, and an inorganic filler is improved by blending therein a component which is obtained by copolymerizing or homopolymerizing a reactive monomer having a vinyl group and an epoxy or phenolic hydroxyl group in a molecule thereof with or preferably in the presence of a thermoplastic elastomer or organic synthetic rubber. Alternatively, the modifying component (C) is obtained by copolymerizing a reactive monomer and a silane monomer with or preferably in the presence of a thermoplastic elastomer or organic synthetic rubber. The composition cures to products having improved thermal shock resistance and adherence.

10 Claims, No Drawings

EPOXY RESIN COMPOSITIONS AND CURED PRODUCTS

This application is a continuation of application Ser. No. 08/181,953 filed on Jan. 18, 1994, now abandoned, which is a continuation of Ser. No. 07/695,012 filed on May 3, 1991, now abandoned.

This invention relates to epoxy resin compositions which cure to products having improved thermal shock resistance and adherence and cured products thereof.

BACKGROUND OF THE INVENTION

A number of problems must be solved before semiconductor packages can be reduced in thickness to satisfy the recent needs in the art. For example, flat packages are mounted on printed circuit boards by immersing the packages in a hot solder bath. Exposure to thermal shocks often causes packages of conventional epoxy resin compositions to crack. It was recently pointed out that if packages had absorbed water prior to mounting on printed circuit boards, steam explosion could occur within the packages upon hot solder immersion, inducing cracks therein.

Countermeasures to these problems have been proposed by addressing to both the frame and the epoxy resin composition, but few are satisfactory. It is thus desired to improve the thermal impact and adherence of an epoxy resin composition.

SUMMARY OF THE INVENTION

Therefore, an object of the present invention is to provide a new and improved epoxy resin composition which cures to products having improved thermal shock resistance and adherence and cured products thereof.

The inventors have found that by blending component (C) or (C') defined later in an epoxy resin composition comprising (A) an epoxy resin, (B) a phenol resin, and (D) an inorganic filler, there is obtained an encapsulating epoxy resin composition which cures to products having improved thermal shock resistance and adherence so that the occurrence of cracks associated with thickness reduction of semiconductor packages may be avoided.

The impact modifier component (C) used herein is either a copolymer of a reactive monomer with a thermoplastic elastomer or organic synthetic rubber or a mixture of a thermoplastic elastomer or organic synthetic rubber and a homopolymer of a reactive monomer.

The reactive monomer is one having a vinyl polymerizable functional group and an epoxy-containing organic group or phenolic hydroxyl group in a molecule thereof. Component (C) may be obtained by copolymerizing a reactive monomer with a thermoplastic elastomer or organic synthetic rubber, or by mixing a homopolymer of a reactive monomer with a thermoplastic elastomer or organic synthetic rubber. The latter may preferably be obtained by homopolymerizing a reactive monomer in the presence of a thermoplastic elastomer or organic synthetic rubber.

Another useful impact modifier is component (C') which is a copolymer of a reactive monomer and a silane monomer with a thermoplastic elastomer or organic synthetic rubber or a mixture of a thermoplastic elastomer or organic synthetic rubber and a copolymer of a reactive monomer with a silane monomer, the reactive monomer being as defined above. Component (C') may be obtained by copolymerizing a reactive monomer and a silane monomer with a thermoplastic elastomer or organic synthetic rubber or by mixing a copolymer of a reactive monomer and a silane monomer with a thermoplastic elastomer or organic synthetic rubber. The latter may preferably be obtained by copolymerizing a reactive monomer and a silane monomer in the presence of a thermoplastic elastomer or organic synthetic rubber.

Therefore, the present invention provides an epoxy resin composition comprising (A) an epoxy resin, (B) a phenol resin, (C) a copolymer or mixture or (C') a copolymer or mixture as defined above, and (D) an inorganic filler.

DESCRIPTION OF THE PREFERRED EMBODIMENTS

A first essential component used in the encapsulating epoxy resin composition of the invention is (A) an epoxy resin. Any desired epoxy resin may be used insofar as it has at least two epoxy groups in its molecule. Examples include bisphenol—A type epoxy resins, novolak type epoxy resins, cycloaliphatic epoxy resins, glycidyl epoxy resins and the like, which may be used alone or in admixture of two or more.

Preferred, non-limiting examples of the epoxy resin are those represented by the following formulae.

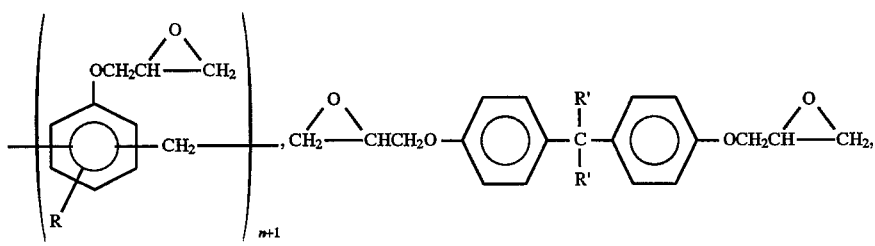

-continued

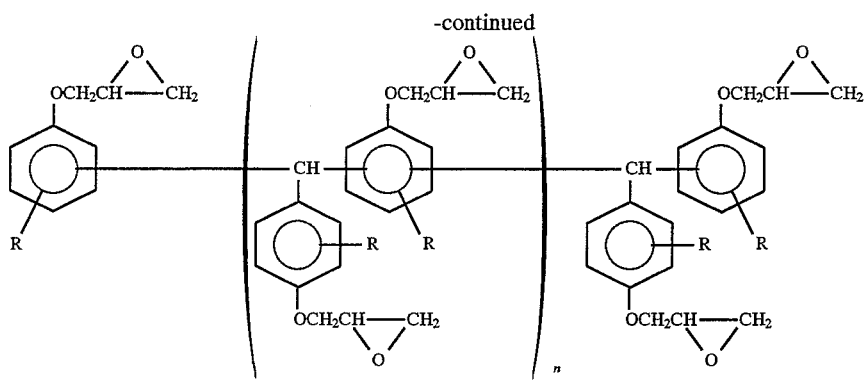

In the formulae, R is hydrogen or methyl, R' is hydrogen, methyl or trifluoromethyl, and n is zero or a positive integer, preferably 0 to 10.

Preferably, the epoxy resins have a softening point of 50° to 100° C. and an epoxy equivalent of 100 to 400.

Brominated epoxy resins form another class of epoxy resins useful for flame retardancy.

A second essential component used in the composition of the invention is (B) a phenol resin which is effective as a curing agent for epoxy resin (A). Preferred are phenol resins having at least two phenolic hydroxyl groups, for example, phenol novolak resins, cresol novolak resins, and triphenol methane. Most often, the phenol resins have a softening point of 60° to 120° C. A hydroxyl equivalent of 90 to 150 is recommended in view of flow.

Preferably, the phenol resin (B) is used in such an amount that the equivalent ratio of the epoxy group in epoxy resin (A) to the hydroxyl group in phenol resin (B) ranges from 0.5 to 2, especially from 0.7 to 1.5. More illustratively, 30 to 100 parts, especially 40 to 70 parts by weight of phenol resin (B) may be used per 100 parts by weight of epoxy resin (A). Less than 30 parts by weight of the phenol resin would provide less strength whereas more than 100 parts by weight of the phenol resin would leave a substantial amount of phenol resin unreacted to adversely affect moisture resistance.

A third essential component used in the epoxy resin composition of the invention is component (C) which may be obtained by (i) copolymerizing a reactive monomer having a vinyl polymerizable functional group and an epoxy-containing organic group or phenolic hydroxyl group in a molecule thereof with a thermoplastic elastomer or organic synthetic rubber, preferably a thermoplastic elastomer or organic synthetic rubber having an aliphatic unsaturated bond, typically vinyl, and also preferably in a solution in which the elastomer or rubber is swollen or dissolved. Alternatively, component (C) may obtained by (ii) mixing a homopolymer of a reactive monomer with a thermoplastic elastomer or organic synthetic rubber as defined above, preferably homopolymerizing a reactive monomer in the presence of a thermoplastic elastomer or organic synthetic rubber. Thus, component (C) is (i) a copolymer of the reactive monomer with the elastomer or rubber or (ii) a mixture of a homopolymer of the reactive monomer and the elastomer or rubber.

The thermoplastic elastomers used herein include styrene-butadiene-methyl methacrylate copolymers (MBS resins), styrene-ethylene-butene-styrene copolymers (SBS resins), styrene-butadiene-vinyl pyridine copolymers, acrylonitrile-butadiene-styrene copolymers (ABS resins), acrylonitrile-styrene copolymers (AS resins), styrene-isoprene copolymers, fluorinated vinylidene resins, carboxy-modified butadiene-acrylonitrile copolymers, thermoplastic nylon, poly(butylene terephthalate) resins, poly(butene-1), polyvinyl acetoacetal resins, polyvinyl butyral resins, polyvinyl formal resins, polyvinyl ether resins, polyester elastomers, polyurethane-methyl methacrylate copolymers, with the styrene-butadiene-methyl methacrylate copolymers being preferred.

The organic synthetic rubbers used herein include those having an aliphatic unsaturated bond, for example, styrene-butadiene copolymers (SBR), propylene-butadiene copolymers (PBR), butadiene-α-methylstyrene copolymers, ethylene-butadiene copolymers, polybutadiene rubber, polyisoprene rubber, acrylonitrile-butadiene rubber, and ethylene-propylene-butadiene rubber.

Most preferred among these are styrene-butadiene copolymers, desirably having a butadiene content of 30 to 95% by weight, most desirably 50 to 75% by weight. A styrene-butadiene copolymer with a butadiene content of less than 30% by weight would form with a reactive monomer a copolymer having an insufficient number of soft segments to provide an epoxy resin composition with flexibility whereas a styrene-butadiene copolymer with a butadiene content of more than 95% by weight would form with a reactive monomer a copolymer which is too soft to provide an epoxy resin composition with mechanical strength. Preferably, the styrene-butadiene copolymers have a Mooney viscosity [$ML_{1+4}(100°$ C.)] of 30 to 60, more preferably 40 to 50. A styrene-butadiene copolymer with a Mooney viscosity of lower than 30 would form a too soft copolymer with a reactive monomer whereas a styrene-butadiene copolymer with a Mooney viscosity of higher than 60 would form with a reactive monomer a copolymer which is too viscous to provide an epoxy resin composition with fluidity. In addition, the styrene-butadiene copolymers preferably have a terminal vinyl content of 10 to 40% by weight, more preferably 13 to 20% by weight. A styrene-butadiene copolymer having a terminal vinyl content of less than 10% by weight would be less reactive with a reactive monomer so that its copolymer with the reactive monomer might be insoluble in the epoxy resin whereas with a terminal vinyl content of more than 40% by weight, crosslinking reaction would take place at the same time as the reaction with a reactive monomer, resulting in a gel. Some useful styrene-butadiene copolymers are commercially available as TUFDEN 2000 and TUFDEN 2100 from Asahi Chemicals Industry Co., Ltd.

The reactive monomer which constitutes component (C) together with the elastomer or rubber just mentioned above is a monomer having a vinyl polymerizable functional group and an epoxy-containing organic group or phenolic hydroxyl group in a molecule thereof. The vinyl polymerizable functional groups include lower alkenyl groups such as vinyl, allyl (CH$_2$=CHCH$_2$—), propenyl (CH$_3$CH=CH$_2$—), and butenyl groups, and acryloyl and methacryloyl groups. The epoxy-containing organic groups include glycidoxy

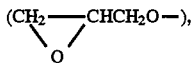

3,4-epoxycyclohexyl

and similar groups.

Reactive monomers having such groups are typified by those monomers of the following structure.

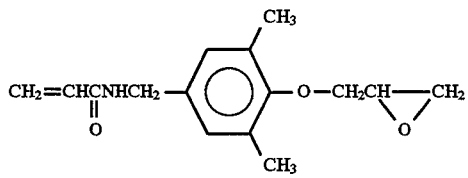 (1)

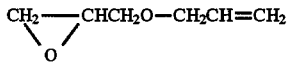 (2)

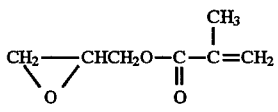 (3)

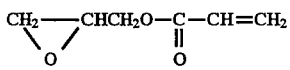 (4)

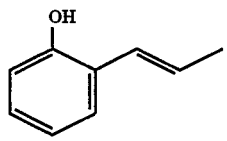 (5)

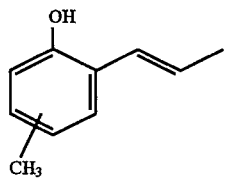 (6)

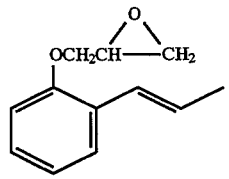 (7)

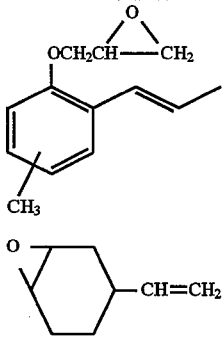

(8)

(9)

In one embodiment where it is desired to react a reactive monomer with a thermoplastic elastomer, preferably the reactive monomer is dissolved in a solvent, to which the thermoplastic elastomer is added and swollen before polymerization reaction is started. In general, the thermoplastic elastomer does not form a uniform solution with an organic solvent. Nevertheless, if polymerization reaction is effected after the thermoplastic elastomer has been added to a solution of the reactive monomer in a solvent and swollen therein, a homopolymer of the reactive monomer or a copolymer of the reactive monomer with the thermoplastic elastomer provides a minute dispersion of the sea-island structure in an epoxy resin composition upon blending thereto, which is more effective for improving the thermal impact and adherence of cured products. The solvents used herein are not particularly limited insofar as they do not dissolve, but swell the thermoplastic elastomer. Examples include toluene, xylene, benzene, hexane, cyclohexane, tetrahydrofuran, methyl isobutyl ketone, acetone, cyclohexanone, methanol, ethanol, butanol, etc. alone or a mixture thereof.

Preferably, the reactive monomer is used in an amount of 1 to 50 parts, more preferably 2 to 30 parts by weight per 100 parts by weight of the thermoplastic elastomer. On this basis, less than 1 part by weight of the reactive monomer would render component (C) less effective for adherence improvement whereas more than 50 parts by weight of the reactive monomer would adversely affect the impact of cured products.

In an alternative embodiment where it is desired to react a reactive monomer with an organic synthetic rubber, preferably the rubber is dissolved in a solvent and the reactive monomer is added thereto before reaction is started. The solvents in which the rubber is dissolved include toluene, xylene, benzene, hexane, cyclohexane, tetrahydrofuran, methyl isobutyl ketone, acetone, cyclohexanone, mehtanol, ethanol, 2-propanol, butanol, etc. alone or a mixture thereof.

Preferably, the reactive monomer is used in an amount of 20 to 200 parts, more preferably 30 to 80 parts by weight per 100 parts by weight of the organic synthetic rubber. On this basis, less than 20 parts by weight of the reactive monomer would render component (C) less effective for adherence improvement whereas more than 200 parts by weight of the reactive monomer would adversely affect the impact of cured products.

In the reaction between the reactive monomer and the elastomer or rubber, since the reactive monomer is of the radical polymerization nature, it is preferred to add a polymerization initiator, for example, azobisisobutyronitrile and benzoyl peroxide, lauroyl peroxide, cumene hydroperoxide, t-butyl hydroperoxide, benzoyl hydroperoxide. The polymerization initiator may be added in an amount of 0.1 to 5 parts, especially 0.5 to 1 parts by weight per 100 parts by weight of the reactived monomer because less than 0.1 part would be ineffective for its purpose and more than 5 parts by weight would quicken the reaction, resulting in a gel. The reaction conditions may be determined without undue experimentation and preferably include a temperature of 30° to 120° C. and a time of 1 to 24 hours. At the end of reaction, the reaction product may be blended in the epoxy resin composition after the solvent is removed in vacuum therefrom.

Instead of component (C), component (C') may also be used in the epoxy resin composition of the invention. Component (C') may be obtained by (i) copolymerizing a reactive monomer having a vinyl polymerizable functional group and an epoxy—containing organic group or phenolic hydroxyl group in a molecule thereof and a silane monomer with a thermoplastic elastomer or organic synthetic rubber. Alternatively, it may be obtained by (ii) mixing a copolymer of a reactive monomer having a vinyl polymerizable functional group and an epoxy—containing organic group or phenolic hydroxyl group in a molecule thereof with a silane monomer with a thermoplastic elastomer or organic sythetic rubber, preferably copolymerizing the reactive monomer with the silane monomer in the presence of the thermoplastic elastomer or organic synthetic rubber. Therefore, component (C') is (i) a copolymer of the two monomers with the elastomer or rubber or (ii) a mixture of the elastomer or rubber and a copolymer of the two monomers.

The reactive monomer is the same as defined for component (C). It can be copolymerized with a monomeric silane compound, preferably a monomeric silane compound having a vinyl polymerizable functional group and a lower alkoxy group, typically those of formulae (10) to (14). Inter alia, a copolymer of a reactive monomer with methacryloxypropyltrimethoxysilane of formula (11) is effective for adherence improvement.

  (10)

  (11)

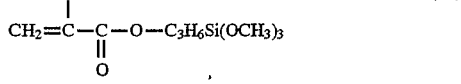  (12)

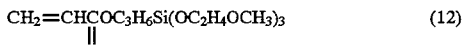

  (13)

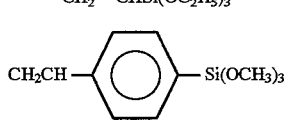  (14)

While the single use of a reactive monomer can sometimes result in a rigid polymer which is less desirable for impact improvement, the combined use of a reactive monomer and a silane monomer always produces a polymer which is effective for impact improvement.

The silane monomer is preferably used in an amount of 0 to 2 parts, more preferably 0.5 to 2 parts, most preferably 0.5 to 1 part by weight per part by weight of the reactive monomer.

Equivalent results are obtained by using a radical polymerizable monomer such as methyl methacrylate instead of the silane compound.

At the end of reaction, the reaction product may be blended in the epoxy resin composition after the solvent is removed in vacuum therefrom as previously mentioned. Desirably, a part of an epoxy resin and a phenol resin used for manufacturing an epoxy resin composition are added to the reaction product whereby the thermoplastic elastomer is homogeneously dispersed before the solvent is removed, and it forms a separate phase as particles having a size of at most 5 microns in the epoxy resin matrix. Since the copolymer has an epoxy group or phenolic hydroxyl group originating from the reactive monomer, the copolymer can form a firm bond with the epoxy resin at the particle interface, resulting in the epoxy resin composition curing to products having improved impact.

Component (C) or (C') is preferably blended in an amount of 1 to 50 parts, more preferably 5 to 10 parts by weight per 100 parts by weight of epoxy resin (A). Less than 1 parts by weight of component (C) or (C') would be less effective for impact improvement whereas more than 50 parts by weight of component (C) or (C') would sometimes result in a loss of mechanical strength.

A fourth essential component used in the composition of the invention is (D) an inorganic filler which is effective for reducing the coefficient of expansion of the encapsulating composition, thereby minimizing stresses to semiconductor elements. Examples of the inorganic filler include fused silica and crystalline silica in crushed or spherical form, as well as alumina, silicon nitride and aluminum nitride. To meet both the requirements of reduced expansion of cured products and ease of molding, the inorganic filler should preferably be a mixture of spherical and crushed fillers or only a spherical filler. Moreover, the inorganic fillers are preferably surface treated with silane coupling agents prior to use.

The inorganic fillers either in crushed or spherical form may have a mean particle size of 5 to 20 microns.

In the composition, the inorganic filler is preferably blended in an amount of 200 to 1600 parts by weight per 100 parts by weight of epoxy resin (A). Compositions containing less than 200 parts by weight of the inorganic filler on this basis will have a higher coefficient of expansion and apply higher stresses to semiconductor elements, causing a lowering of element properties. Compositions containing more than 1600 parts by weight of the inorganic filler are too viscous to mold.

In the practice of the invention, a curing catalyst is preferably blended in the epoxy resin composition. Useful curing catalysts include imidazole and its derivatives, phosphine derivatives, and cycloamidine derivatives.

The amount of the curing catalyst used is not particularly limited although it preferably ranges from 0.001 to 5 parts, more preferably from 0.1 to 2 parts by weight per 100 parts by weight of epoxy resin (A). Less than 0.001 part by weight of the curing catalyst would be less effective for promoted curing whereas more than 5 parts by weight of the curing catalyst would cause the composition to cure too quickly, resulting in unacceptable molded products.

Moreover, in the practice of the invention, the composition preferably contains a flexibilizer for stress reduction purposes in addition to the essential components. The flexibilizers are of silicone type and include, for example, silicone rubber powder, silicone gel, and block polymers of an organic resin with a silicone polymer. Instead of adding such a flexibilizer, it is also possible to treat the inorganic filler on the surface with a two-part silicone rubber or silicone gel. The flexibilizer is preferably used in an amount of 0 to 10%, preferably 0.5 to 10%, more preferably 1 to 5% by weight based on the total weight of the composition. Impact improvement would be insufficient with less than 0.5% by weight of the flexibilier whereas compositions would somewhat lose mechanical strength with more than 10% by weight of the flexibilizer.

In the practice of the invention, the epoxy resin composition of the invention may contain any other optional additives if desired and insofar as the benefits of the invention are not materially affected. Such optional additives include mold release agents such as carnauba wax, higher fatty acids, and synthetic waxes, silane coupling agents, antimony oxide, and phosphorus compounds.

The epoxy resin compositions of the invention can be prepared in a conventional manner, for example, by mixing predetermined amounts of the essential and optional components as desired, milling the mixture in a kneader, roll mill or extruder heated at 70° to 95° C., cooling down and comminuting the mixture. The order of blending the components is not critical.

The epoxy resin compositions of the invention are effective for encapsulating semiconductor devices such as IC, LSI, transistors, thyristors, and diodes as well as the fabrication of printed circuit boards. For the encapsulation of semiconductor devices, the compositions may be molded by conventional well-known techniques, for example, transfer molding, injection molding, and casting. Most often, the compositions are molded at 150° to 180° C. and post cured at 150° to 180° C. for 2 to 16 hours.

There have been described epoxy resin compositions which cure to products having improved thermal shock resistance and adherence. The compositions are thus effective for encapsulating semiconductor elements while eliminating the problems associated with the recent needs for thickness reduction of semiconductor packages.

EXAMPLE

Examples of the present invention are given below by way of illustration and not by way of limitation. All parts and percents are by weight unless otherwise stated.

First, synthesis of component (C) is illustrated. It is to be noted that EPBA is an abbreviation for N-[4-2,3-epoxypropoxy]-3,5-dimethylbenzylacrylamide reactive monomer of the following formula:

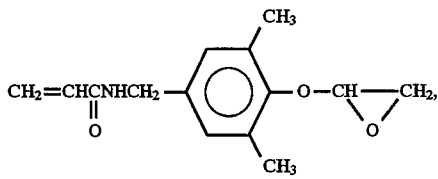

BPO for benzoyl peroxide, and THF for tetrahydrofuran.

Synthesis 1

A 2-liter flask equipped with a reflux condenser, thermometer, and nitrogen inlet tube was charged with 100 ml of toluene, 5 grams of EPBA, 5 grams of methyl methacrylate, and 0.5 grams of BPO. After the latter three compounds were uniformly dissolved in the solvent, 200 grams of a styrene-butadiene-methyl methacrylate copolymer (KaneAce B-56, Kanegafuchi Chemical Industry K.K. butadiene content 65%) was added to the solution and swollen therewith. While passing nitrogen, the mixture was allowed to react at 40° for 5 hours, obtaining a copolymer of the reactive monomers (EPBA and methyl methacrylate) with the thermoplastic resin (KaneAce B-56)

At the end of reaction, the reaction solution was divided into two. From one part of the reaction solution, the toluene was removed through direct vacuum distillation, obtaining a copolymer (1-A). To the other part of the reaction solution was added 250 grams of an epoxy resin (EOCN 1020, Nihon Kayaku K.K.) whereupon the copolymer of the reactive monomer with the thermoplastic resin (KaneAce B-56) was uniformly melt dispersed in the epoxy resin. Subsequent removal of the toluene in vacuum resulted in a copolymer (1-B).

Synthesis 2

A 2-liter flask equipped with a reflux condenser, thermometer, and nitrogen inlet tube was charged with 100 ml of THF, 4 grams of EPBA, 6 grams of γ-methacryloxypropyltrimethoxy-silane, and 0.5 grams of BPO. After the latter three compounds were uniformly dissolved in the solvent, 200 grams of a saturated thermoplastic elastomer (hydrogenated styrene-butadiene rubber, TUFTEC by Asahi Chemicals Industry Co. Ltd.) was added to the solution and swollen therewith. While passing nitrogen, the mixture was allowed to react at 40° C. for 5 hours, obtaining a mixture of a copolymer of the two reactive monomers (EPBA and silane) and the thermoplastic elastomer (Toughtec).

At the end of reaction, the reaction solution was divided into two. From one part of the reaction solution, the THF was removed through direct vacuum distillation, obtaining a mixture (2-A). To the other part of the reaction solution was added 250 grams of an epoxy resin (EOCN 1020, Nihon Kayaku K.K.) whereupon the mixture of a copolymer of the two reactive monomers (EPBA and silane) and the thermoplastic elastomer (Toughtec) was uniformly melt dispersed in the epoxy resin. Subsequent removal of the toluene in vacuum resulted in a mixture (2-B).

Synthesis 3

A 2-liter flask equipped with a reflux condenser, thermometer, and nitrogen inlet tube was charged with 50 ml of toluene, 5 grams of EPBA, and 0.5 grams of BPO. After the latter two compounds were uniformly dissolved in the solvent, 200 gams of a styrene-butadiene-methyl methacrylate copolymer (KaneAce B-56, Kanegafuchi Chemical Industry K.K., butadiene content 65%) was added to the solution and swollen therewith. While passing nitrogen, the mixture was allowed to react at 80° C. for 5 hours, obtaining a copolymer of the reactive monomer (EPBA) with the thermoplastic resin (KaneAce B-56).

At the end of reaction, 300 grams of an epoxy resin (EOCN 1020, Nihon Kayaku K.K.) was added to the reaction solution whereupon the copolymer of the reactive monomer with the thermoplastic resin (KaneAce B-56) was uniformly melt dispersed in the epoxy resin. Subsequent removal of the toluene in vacuum resulted in a copolymer (3).

Synthesis 4

A 2-liter flask equipped with a reflux condenser, thermometer, and nitrogen inlet tube was charged with 100 ml of toluene, 5 grams of 2-propenylphenol, 5 grams of methyl methacrylate, and 0.5 grams of BPO. After the latter three compounds were uniformly dissolved in the solvent, 200 grams of a styrene-butadiene-methyl methacrylate copolymer (KaneAce B-56, Kanegafuchi Chemical Industry K.K., butadiene content 65%) was added to the solution and swollen therewith. While passing nitrogen, the mixture was allowed to react at 40° C. for 5 hours, obtaining a copolymer of the reactive monomer with the thermoplastic resin (KaneAce B-56).

At the end of reaction, 250 grams of an epoxy resin (EOCN 1020, Nihon Kayaku K.K.) was added to the reaction solution whereupon the copolymer of the reactive monomer with the thermoplastic resin (KaneAce B-56) was uniformly melt dispersed in the epoxy resin. Subsequent removal of the toluene in vacuum resulted in a copolymer (4).

Synthesis 5

A 1-liter flask equipped with a reflux condenser, thermometer, and nitrogen inlet tube was charged with 150 ml of toluene, 50 ml of methyl isobutyl ketone, and 25 ml of 2-propanol. In the solvent mixture was dissolved 15 grams of a styrene-butadiene copolymer (Toughden 2100, by Asahi Chemicals K.K., butadiene content 75%, Mooney viscosity $ML_{1+4}(100°$ C.) 66, terminal vinyl content 13%). Then 10 grams of EPBA, 10 grams of methyl methacrylate, and 0.5 grams of BPO were added to the solution and uniformly dissolved therein. While passing nitrogen, the solution was allowed to react at 100° C. for 5 hours.

At the end of reaction, 100 grams of an epoxy resin (EOCN 1020, Nihon Kayaku K.K.) was added to the reaction solution whereupon the copolymer was uniformly melt dispersed in the epoxy resin. Subsequent removal of the toluene in vacuum resulted in a copolymer (5).

Synthesis 6

A copolymer (6) was obtained by repeating Synthesis 5, but by using 1 grams of γ-methacryloxypropyltrimethoxysilane instead of 10 grams of methyl methacrylate.

Synthesis 7

A copolymer (7) was obtained by repeating Synthesis 6, but by using 20 grams of EPBA and omitting methyl methacrylate.

Synthesis 8

Synthesis 5 was repeated except that 10 grams of EPBA was replaced by 10 grams of 2-propenylphenol. The solution was allowed to react at 100° C. for 5 hours.

At the end of reaction, 50 grams of a phenol resin (TD 2093, Dai-Nihon Ink K.K.) was added to the reaction solution, whereupon the copolymer was uniformly melt dispersed in the phenol resin. Subsequent removal of the toluene in vacuum resulted in a copolymer (8).

The following examples illustrate the invention.

Examples 1–12 and Comparative Example 1–2

Fourteen epoxy resin compositions were prepared by blending the components shown in Table 1 with 10 parts of antimony trioxide, 1.5 parts of γ-glycidoxypropyltrimethoxysilane, 1.0 part of carbon black, and 0.8 part of triphenyl phosphine, and uniformly melt milling the blends in a hot two-roll mill.

The epoxy resin compositions were measured for the following properties. The results are shown in Table 1.

Spiral flow

Spiral flow was measured using a mold according to the EMMI standards at 175° C. under a pressure of 70 $kg/cm^2$.

Mechanical Strength (Flexural Strength and Modulus)

According to JIS K-6911, test bars of 10×100×4 mm were prepared by molding for 2 minutes at 175° C. under a pressure of 70 $kg/cm^2$ and post curing for 4 hours at 180° C.

Glass Transition Temperature (Tg) and Coefficient of Linear Expansion (γ)

Test bars of 4×4×15 mm were prepared by molding for 2 minutes at 175° C. under a pressure of 70 $kg/cm^2$ and post curing for 4 hours at 180° C. Using a dilatometer, the test bars were examined by heating them at a rate of 5° C./min.

Soldering Crack Resistance after Moisture Absorption and Moisture Resistance

Semiconductor devices designed for a moisture resistance test for aluminum wiring corrosion examination were bonded to flat packages of 2 mm thick and then encapsulated with the epoxy resin compositions by molding at 175° C. and 70 $kg/cm^2$ for 2 minutes and post curing at 180° C. for 4 hours. The package samples were allowed to stand in a hot humid atmosphere at 85° C. and RH 85% for 72 hours for moisture absorption and then immersed in a solder bath at 260° C. for 10 seconds. For each composition, the samples were observed whether they were cracked or not. The result is the number of cracked samples per twenty test samples.

Further, twenty sound package samples that passed the solder test were allowed to stand in a saturated steam atmosphere at 120° C. for 500 hours.

Adherence

A column having a diameter of 15 mm and a height of 5 mm was formed on a 42 alloy plate from the epoxy resin composition by molding the resin on the plate at 175° C. and 75 $kg/cm^2$ for 2 minutes and post curing at 180° for 4 hours. Using a push-pull gage, the force required to separate the molded column from the plate was measured.

TABLE 1

| | Example | | | | | | |
|---|---|---|---|---|---|---|---|
| | 1 | 2 | 3 | 4 | 5 | 6 | 7 |
| Composition (pbw) | | | | | | | |
| Epoxy resin | 54 | 50 | 41 | 57 | 50 | 41 | 52 |
| Phenol resin | 35 | 35 | 35 | 35 | 35 | 35 | 35 |
| Brominated epoxy resin | 7 | 7 | 7 | 7 | 7 | 7 | 7 |
| Copolymer (1-A) | | | | 3 | | | |
| Copolymer (1-B) | 5 | 10 | 23 | | | | |
| Copolymer (2-A) | | | | | | | |
| Copolymer (2-B) | | | | | | 10 | 23 |
| Copolymer (3) | | | | | | | 10 |
| Copolymer (4) | | | | | | | |
| KaneAce B-56 | | | | | | | |
| Fused silica | 300 | 300 | 300 | 300 | 300 | 300 | 300 |

TABLE 1-continued

| Properties | | | | | | | |
|---|---|---|---|---|---|---|---|
| Spiral flow, cm | 71 | 69 | 67 | 68 | 67 | 65 | 61 |
| Flexural strength, kg/mm$^2$ | 14.5 | 14.1 | 13.7 | 15.1 | 14.0 | 13.5 | 14.7 |
| Flexural modulus, kg/mm$^2$ | 1390 | 1330 | 1220 | 1420 | 1380 | 1240 | 1360 |
| Tg, °C. | 165 | 166 | 164 | 165 | 164 | 161 | 163 |
| μ, × 10$^{-5}$/°C. | 1.5 | 1.5 | 1.4 | 1.5 | 1.5 | 1.4 | 1.5 |
| Cracked samples by soldering | 1/20 | 0/20 | 0/20 | 2/20 | 0/20 | 0/20 | 0/20 |
| Rejected samples after steaming | 1/20 | 0/20 | 0/20 | 0/20 | 0/20 | 0/20 | 0/20 |
| Adherence, kg | 25 | 37 | 35 | 26 | 34 | 35 | 36 |

| | Example | | | | | Comparative Example | |
|---|---|---|---|---|---|---|---|
| | 8 | 9 | 10 | 11 | 12 | 1 | 2 |
| Composition (pbw) | | | | | | | |
| Epoxy resin | 52 | 51 | 50 | 50 | 53 | 58 | 58 |
| Phenol resin | 35 | 35 | 35 | 35 | 35 | 35 | 35 |
| Brominated epoxy resin | 7 | 7 | 7 | 7 | 7 | 7 | 7 |
| Copolymer (1-A) | | | | | | | |
| Copolymer (1-B) | | 5 | 10 | 10 | | | |
| Copolymer (2-A) | | | | | 3 | | |
| Copolymer (2-B) | | | | | | | |
| Copolymer (3) | | | | | | | |
| Copolymer (4) | 10 | 5 | | | | | |
| KaneAce B-56 | | | | | | | 5 |
| Fused silica | 300 | 300 | 400 | 500 | 300 | 300 | 300 |
| Properties | | | | | | | |
| Spiral flow, cm | 63 | 65 | 54 | 47 | 61 | 75 | 65 |
| Flexural strength, kg/mm$^2$ | 14.2 | 14.9 | 14.6 | 14.7 | 15.3 | 14.8 | 14.1 |
| Flexural modulus, kg/mm$^2$ | 1290 | 1300 | 1280 | 1270 | 1390 | 1410 | 1350 |
| Tg, °C. | 166 | 165 | 164 | 167 | 167 | 165 | 164 |
| μ, × 10$^{-5}$/°C. | 1.4 | 1.5 | 1.2 | 1.0 | 1.5 | 1.6 | 1.5 |
| Cracked samples by soldering | 0/20 | 0/20 | 0/20 | 0/20 | 1/20 | 20/20 | 10/20 |
| Rejected samples after steaming | 0/20 | 0/20 | 0/20 | 0/20 | 0/20 | — | 7/20 |
| Adherence, kg | 35 | 36 | 35 | 36 | 30 | 1 | 20 |

*Epoxy resin: EOCN 1020 by Nihon Kayaku K.K.
Phenol resin: TD 2093 by Dai-Nihon Ink K.K.

As is evident from Table 1, the epoxy resin compositions having a copolymer or mixture of a reactive monomer having a substituted or unsubstituted vinyl group and an epoxy group or phenolic hydroxyl group in a molecule thereof with a thermoplastic elastomer blended in addition to an epoxy resin, phenol resin, inorganic filler and curing Catalyst (Examples 1–12) cure to products having excellent thermal shock resistance and adherence.

Examples 13–23 and Comparative Examples 3–4

Epoxy resin compositions were prepared by blending the components shown in Table 2 with 10 parts of antimony trioxide, 1.5 parts of γ-glycidoxypropyltrimethoxysilane, 1.0 part of carbon black, and 0.8 parts of triphenyl phosphine, and uniformly melt milling the blends in a hot two-roll mill.

The epoxy resin compositions were measured for the same properties as above. The results are shown in Table 2.

TABLE 2

| | Example | | | | | | |
|---|---|---|---|---|---|---|---|
| | 13 | 14 | 15 | 16 | 17 | 18 | 19 |
| Composition (pbw) | | | | | | | |
| Epoxy resin | 56 | 52 | 45 | 56 | 52 | 45 | 51 |
| Phenol resin | 32 | 31 | 28 | 32 | 31 | 28 | 32 |
| Brominated epoxy resin | 7 | 7 | 7 | 7 | 7 | 7 | 7 |
| Copolymer (5) | 5 | 10 | 20 | | | | |
| Copolymer (6) | | | | 5 | 10 | 20 | |
| Copolymer (7) | | | | | | | 10 |
| Copolymer (8) | | | | | | | |
| Untreated Toughden 2100 | | | | | | | |
| Fused silica | 300 | 300 | 300 | 300 | 300 | 300 | 300 |
| Properties | | | | | | | |
| Spiral flow, cm | 73 | 72 | 75 | 69 | 69 | 71 | 70 |
| Flexural strength, kg/mm$^2$ | 13.1 | 12.8 | 12.5 | 12.8 | 12.7 | 12.5 | 12.9 |
| Flexural modulus, kg/mm$^2$ | 1310 | 1290 | 1180 | 1270 | 1240 | 1210 | 1250 |
| Tg, °C. | 162 | 161 | 162 | 163 | 161 | 160 | 162 |

TABLE 2-continued

| | | | | | | | |
|---|---|---|---|---|---|---|---|
| $\mu$, × $10^{-5}$/°C. | 1.6 | 1.6 | 1.5 | 1.6 | 1.6 | 1.5 | 1.6 |
| Cracking by soldering | 0/20 | 0/20 | 0/20 | 2/20 | 0/20 | 0/20 | 0/20 |
| Cracking by steaming | 0/20 | 0/20 | 0/20 | 0/20 | 0/20 | 0/20 | 0/20 |
| Adherence, kg | 25 | 28 | 30 | 24 | 26 | 29 | 27 |

| | Example | | | | Comparative Example | |
|---|---|---|---|---|---|---|
| | 20 | 21 | 22 | 23 | 3 | 4 |
| Composition (pbw) | | | | | | |
| Epoxy resin | 54 | 53 | 52 | 52 | 58 | 58 |
| Phenol resin | 29 | 30 | 31 | 31 | 37 | 37 |
| Brominated epoxy resin | 7 | 7 | 7 | 7 | 7 | 7 |
| Copolymer (5) | | 5 | 10 | 10 | | |
| Copolymer (6) | | | | | | |
| Copolymer (7) | | | | | | |
| Copolymer (8) | 10 | 5 | | | | |
| Untreated Toughden 2100 | | | | | | 10 |
| Fused silica | 300 | 300 | 400 | 500 | 300 | 300 |
| Properties | | | | | | |
| Spiral flow, cm | 69 | 67 | 61 | 57 | 71 | 72 |
| Flexural strength, kg/mm$^2$ | 12.8 | 12.4 | 12.8 | 12.6 | 13.4 | 9.9 |
| Flexural modulus, kg/mm$^2$ | 1260 | 1240 | 1320 | 1340 | 165 | 1380 |
| Tg, °C. | 164 | 163 | 162 | 163 | 165 | 164 |
| $\mu$, × $10^{-5}$/°C. | 1.6 | 1.6 | 1.4 | 1.2 | 1.8 | 1.8 |
| Cracking by soldering | 0/20 | 0/20 | 0/20 | 0/20 | 20/20 | 2/20 |
| Cracking by steaming | 0/20 | 0/20 | 0/20 | 0/20 | — | 18/20 |
| Adherence, kg | 28 | 27 | 29 | 28 | 2 | 14 |

*Epoxy resin: EOCN 1020 by Nihon Kayaku K.K., Phenol resin: TD 2093 by Dai-Nihon Ink K.K. "Cracking by soldering" and "cracking by steaming" are reported by the number of cracked samples per the number of test samples.

As is evident from Table 2, the epoxy resin compositions having blended a copolymer of a reactive monomer having a vinyl group and a substituted or unsubstituted epoxy group or phenolic hydroxyl group in a molecule thereof with a synthetic rubber (Examples 13–23) are improved in adherence, crack resistance upon soldering after moisture absorption and moisture resistance as compared with the compositions having blended therein the synthetic resin which has not been reacted with the reactive monomer.

Although some preferred embodiments have been described, many modifications and variations may be made thereto in the light of the above teachings. It is therefore to be understood that within the scope of the appended claims, the invention may be practiced otherwise than as specifically described.

We claim:

1. An epoxy resin composition comprising (A) an epoxy resin, (B) a phenol resin, (C) a component obtained by copolymerizing a reactive monomer selected from the group consisting of N-4-2,3-epoxypropoxy)-3,5-dimethylbenzylacrylamide and 2-propenylphenol, with a styrene-butadiene-methyl methacrylate copolymer or styrene-butadiene copolymer, said component (C) being a graft copolymer of said reactive monomer with said styrene-butadiene-methyl methacrylate copolymer or styrene-butadiene copolymer, and (D) an inorganic filler.

2. The composition of claim 1 which comprises 100 parts by weight of component (A), 30 to 50 parts by weight of component (B), 1 to 50 parts by weight of component (C), and 200 to 1600 parts by weight of component (D).

3. The composition of claim 1 wherein said component (C) was obtained by copolymerizing said reactive monomer with a styrene-butadiene-methyl methacrylate copolymer.

4. The composition of claim 3, wherein said reactive monomer is used in an amount of 1 to 50 parts by weight per 100 parts by weight of said styrene-butadiene-methyl methacrylate copolymer.

5. The composition of claim 4, wherein said reactive monomer is used in an amount of 2 to 30 parts by weight per 100 parts by weight of said styrene-butadiene-methyl methacrylate copolymer.

6. The composition of claim 1 wherein said component (C) was obtained by copolymerizing said reactive monomer with a styrene-butadiene copolymer.

7. The composition of claim 6, wherein said reactive monomer is used in an amount of 20 to 200 parts by weight per 100 parts by weight of said styrene-butadiene copolymer.

8. The composition of claim 7, wherein said reactive monomer is used in an amount of 30 to 80 parts by weight per 100 parts by weight of said styrene-butadiene copolymer.

9. The composition of claim 1 wherein said reactive monomer is copolymerized in an organic solvent in which said styrene-butadiene-methyl methacrylate copolymer or styrene-butadiene co-polymer is swollen or dissolved.

10. A cured product obtained by curing the composition of claim 1.

* * * * *